Patented Apr. 6, 1926.

1,579,949

UNITED STATES PATENT OFFICE.

WASHINGTON P. PECK, OF PAINESVILLE, OHIO.

BOILER COMPOUND.

No Drawing. Application filed October 30, 1924. Serial No. 746,872.

*To all whom it may concern:*

Be it known that I, WASHINGTON P. PECK, a citizen of the United States, residing at Painesville, in the county of Lake and State of Ohio, have invented certain new and useful Improvements in Boiler Compounds, of which the following is a specification.

This invention relates to boiler cleaning compounds and has for an object to provide a composition which will dissolve and thoroughly remove scale and incrustation from the inside of steam boilers, without injury to the walls thereof.

My compound consists of extract of hemlock, soda ash, brown sugar and water in the following proportions and prepared in the following manner.

To forty pounds of extract of hemlock, there is added sixty pounds of soda ash and ten pounds of brown sugar. To this mixture there is added thirty gallons of water. This mixture is boiled with steam for two hours whereupon the same is ready for use.

The amount of this composition suitable for use, varies according to the size of the boiler. Taking for example, a one-hundred horse power steam boiler, one quart of the compound would be used every twenty-four hours. The boilers should be blown down every twenty-four hours, thus dissolving the scale into a brown mud which can be practically completely blown out through the blow-off valves. In cases where the boiler is badly scaled, it should be preferably opened up and washed every three weeks for the first sixty days in addition to the aforementioned use of this compound every twenty-four hours. After the boiler is cleaned, the amount of compound used every twenty-four hours may be reduced to one pint which will suffice to keep the boilers entirely free from scale, incrustation or any other foreign matter.

Obviously while the amount of compound to be used as herein suggested is based upon the experimental use of the same, the amounts may be increased or decreased as the conditions suggest to the engineer in charge.

A continued use of a compound in accordance with this invention has proven conclusively that it will not affect or injure in any manner whatsoever the plates or packing of the boiler.

Having thus described my invention what I claim as new is:—

A boiler cleaning compound, the principal ingredients of which consist of extract of hemlock, forty pounds; soda ash, sixty pounds; brown sugar, ten pounds; and water, thirty gallons; prepared in the manner herein described and for the purpose specified.

In testimony whereof I affix my signature.

WASHINGTON P. PECK.